United States Patent [19]

Drake et al.

[11] Patent Number: 4,940,833

[45] Date of Patent: Jul. 10, 1990

[54] OLEFIN MONOMER SEPARATION PROCESS

[75] Inventors: Charles A. Drake, Nowata; William R. Parrish; Roy C. Lee, both of Bartlesville, all of Okla.

[73] Assignee: Phillips Petroleum Company, Bartlesville, Okla.

[21] Appl. No.: 277,368

[22] Filed: Nov. 29, 1988

[51] Int. Cl.$^5$ ............................................. C07C 7/05
[52] U.S. Cl. .................................. 585/868; 585/522; 585/523; 585/525
[58] Field of Search ................ 585/868, 522, 523, 525

[56] References Cited

U.S. PATENT DOCUMENTS

| | | | |
|---|---|---|---|
| 2,443,229 | 6/1948 | Dawson et al. | 585/868 |
| 3,083,192 | 3/1963 | Davison et al. | 260/93.7 |
| 3,280,090 | 10/1966 | Scoggin | 260/93.7 |
| 3,342,794 | 9/1967 | Buchanan | 260/93.7 |
| 3,448,160 | 6/1969 | Schleimer | 585/868 |
| 3,502,633 | 3/1970 | Schwaar et al. | 260/93.7 |
| 3,703,559 | 11/1927 | Kerfoot et al. | 585/868 |
| 3,733,368 | 5/1973 | Dood et al. | 585/868 |
| 3,751,518 | 8/1971 | Hagan et al. | 585/511 |
| 3,903,066 | 9/1975 | Rohde | 260/93.7 |
| 4,022,839 | 5/1977 | Beuther et al. | 585/868 |
| 4,117,023 | 9/1978 | Gillet et al. | 585/868 |
| 4,143,085 | 3/1979 | Funada et al. | 585/868 |
| 4,342,854 | 8/1982 | Hogan et al. | 526/75 |
| 4,664,675 | 3/1987 | Torck et al. | 44/60 |

*Primary Examiner*—Patrick P. Garvin
*Assistant Examiner*—E. D. Irzinski
*Attorney, Agent, or Firm*—Lynda S. Jolly

[57] ABSTRACT

Olefin monomer is recovered from a liquid polymerization reaction mixture comprising olefin monomer, catalyst residue, and catalyst deactivation compounds by washing the mixture with water and then separating the organic phase and aqueous phase. The liquid mixture can also comprise soluble olefin polymer.

25 Claims, No Drawings

OLEFIN MONOMER SEPARATION PROCESS

BACKGROUND OF THE INVENTION

This invention relates to polymerization and polymer and monomer recovery processes.

Polymerization, polymer recovery, and monomer recovery processes usually involve several steps or phases. A monomer, which can be an olefin, is contacted with a catalyst capable of polymmerization the monomer under conditions suitable to form a solid polymer. The resultant polymerization process product, comprising unreacted monomer, polymer, and catalyst residue, can be combined with one or more catalyst deactivation compounds to reduce and inhibit any remaining catalyst activity. The different components of this final polymerization process mixture can be separated, purified, and, if desired and possible, recycled.

Solid, insoluble, and/or particulate polymer can be removed rather easily. The remaining substantially liquid polymerization reaction mixture usually comprises unreacted monomer, catalyst residue, catalyst deactivation compounds, and/or soluble polymer. It is desirable and beneficial to separate this reaction mixture in order to recover and recycle the different components, such as, for example, unreacted monomer. Unfortunately, an azeotropic mixture can be formed with the catalyst deactivation compound(s) and unreacted monomer. Thus, the separation process, if done thoroughly, can be very time-consuming, complex, and costly.

SUMMARY OF THE INVENTION

It is an object of this invention to provide a process to separate and recover olefin monomer from a liquid mixture.

It is another object of this invention to provide an efficient, economical, and relatively simple process to separate and recover olefin monomer from a liquid mixture.

It is yet another object of this invention to provide a process to separate and recover substantially pure olefin monomer from a liquid mixture.

It is a more specific object of this invention, to provide a process to separate and recover olefin monomer from a substantially liquid polymerization reaction mixture comprising olefin monomer, catalyst residue, catalyst deactivation compounds, and, optionally, soluble polymer.

In accordance with this invention, the substantially liquid polymerization reaction mixture is contacted with a sufficient amount of water to form an organic phase and an aqueous phase, wherein said organic phase comprises olefin monomer and, if present, olefin polymer and said aqueous phase comprises catalyst residue and catalyst deactivation compounds.

In a more specific embodiment of the invention, the catalyst deactivation compound is an alcohol, most preferably methanol.

DESCRIPTION OF THE PREFERRED EMBODIMENTS

The inventive water contacting process can be used with any substantially liquid mixture comprising olefin monomer, catalyst residue, and catalyst deactivation compound(s). Optionally, soluble olefin polymer can be present in the liquid mixture. Liquid mixtures comprising these components usually can be a product of olefin polymerization reactions. Thus, prior to commencing the inventive water contacting process, at least one preliminary physical separation must have already occurred. The liquid polymerization reaction mixture, when contacted with water, must be in substantially liquid form; substantially all solid, insoluble, and/or particulate matter, such as, for example, solid olefin polymer and/or solid catalyst, must be removed before the water contacting process occurs. As used in this disclosure, the terms "liquid polymerization reaction mixture" and "liquid mixture" are defined as the liquid remaining after substantially all solid, insoluble, and/or particulate matter has been removed.

As used in this disclosure, the term "olefin monomer", even though singular, can be one or more of the same or different olefin monomers. The olefin monomer in the liquid mixture can be any olefin. Preferably, the olefin monomer is a linear or branched aliphatic alpha-olefin having from about 2 to about 30 carbon atoms. More preferably, the olefin monomer has from about 3 to about 20 carbon atoms per molecule because these monomers can be easier to polymerize. One or more olefin monomers can be present in the mixture, depending on the polymerization process and whether a homopolymer or copolymer is produced. For example, the olefin monomer can be ethylene, butylene, and/or hexene. Another example would be a higher, branched alpha-olefin, such as, for example, 3-methyl-1-butene (3MB1), 3-methyl-1-pentene (3MP1), 4-methyl-1-pentene (4MP1), 4-methyl-1-hexene (4MH1), 3,3-dimethyl-1-butene (3,3DMB1), 4,4-dimethyl-1-hexene (4,4DMH1), and mixtures thereof, either alone or in combination with one or more different monomers. If a copolymer of a branched, higher alpha-olefin is produced, generally the comonomer has from about 2 to about 18 carbon atoms and preferably, from about 8 to about 16 carbon atoms. Longer chain, linear olefins are preferred as comonomers with higher, branched alpha-olefins in that these comonomers are easier to copolymerize with higher, branched alpha-olefins and can impart increased clarity, stability, and impact strength to the resultant polymer. Exemplary comonomers which can be polymerized with branched, higher alpha-olefins include, but are not limited to, 1-octene, 1-decene, 1-dodecene, 1-tetradecene, 1-hexadecene, and other higher olefins.

The process of this invention is especially applicable to polymerization processes to produce homopolymers of higher, branched alpha-olefins and copolymers of higher, branched alpha-olefins and linear higher alpha-olefins. The most preferred higher, branched alpha-olefin is 4-methyl-1-pentene, which can be used either alone or with one or more of the comonomers discussed above, to produce homopolymers of 4-methyl--pentene or copolymers of 4-methyl-1-pentene and longer chain, linear olefins.

The catalyst residue in the liquid mixture can be any polymerization catalyst residue which can be solubilized in this liquid mixture. The catalyst residue can have several components. One component can comprise at least one catalytic transition metal which is, or was, associated with at least one halogen. Exemplary transition metals include, but are not limited to titanium, vanadium, and/or zirconium; titanium is the most preferred transition metal due to high catalytic activity. Exemplary halogens include, but are not limited to fluorine, chlorine, and/or bromine; chlorine is most preferred because of high catalytic activity when used with titanium. The most preferred transition metal-halogen catalyst compound is titanium trichloride (TiCl$_3$), due to excellent polymerization activity.

Another component of the catalyst residue can be at least one organo-metallo compound in which a metal which is, or was, associated with an organic component. Exemplary metals include, but are not limited to, boron, aluminum, silicon, and/or tin. Aluminum is most preferred because of ease of use and good catalytic activity. Each organic component, which can be the same or different with each metal, can be any organic radical with about thirty or less carbon atoms. Preferably, each organic component is aliphatic and has less than about twenty carbon atoms.

This invention preferably is not used with liquid mixtures which comprise magnesium as part of the catalyst residue. Better, more economical separation techniques are known and can be used if magnesium is present.

The catalyst deactivation compound can be one or more compounds which have been added, either batchwise or continuously, after the polymerization process to at least reduce or inhibit, and preferably halt, any remaining catalytic activity. The catalyst deactivation compound can be one or more compounds that are capable of solubilizing the transition metal portion of the catalyst and/or catalyst residue. These catalyst deactivation compounds usually contain an active hydrogen which can react with a halide, and thus solubilize, or dissolve, any metals which can be in the polymerization catalyst.

Exemplary catalyst deactivation compounds include, but are not limited to, oxygen-containing compounds, such as, for example, alcohols, dicarbonyls, and/or alkylene oxides. The use of dicarbonyls, or diketones, and alkylene oxides is disclosed in U.S. Pat. No. 3,280,090 to Scoggin (incorporated herein by reference) and U.S. Pat. No. 3,342,794 to Buchanan (incorporated herein by reference). Preferred catalyst deactivation compounds are alcohols having from about 1 to about 4 carbon atoms, including, but not limited to, methanol, ethanol, n-propanol, isopropanol, n-butanol, isobutanol, and mixtures thereof. Preferred alcohols are selected from the group consisting of methanol, ethanol, and mixtures thereof because of their availability and solubility in water. Methanol is most preferred because methanol does not form an azeotropic mixture with water and can be relatively easily separated from water.

If alcohol is the catalyst deactivation compound, any amount of alcohol can be used which is sufficient to deactivate and/or dissolve the catalyst and/or catalyst residue. If too much alcohol is used, the alcohol can be difficult to separate and the process can be costly. If too little alcohol is used, the catalyst can remain active and/or not dissolve; thus, the catalyst residue can be difficult to remove. Usually, the amount of alcohol added after the polymerization process to deactivate the catalyst is from about 0.2 to about 5 times, preferably from about 0.3 to about 4 times the weight of the polymerization process product. Most preferably, for ease in later separation and economy, alcohol is added in an amount from about 0.5 to about 3 times the weight of the polymerization process product; i.e., about 0.5 parts by weight to about 3 parts by weight of alcohol is added for every part by weight of polymerization process product.

In addition to olefin monomer, catalyst residue, and catalyst deactivation compounds, the liquid polymerization reaction mixture can comprise soluble olefin polymer. As stated earlier, substantially all solid, insoluble, and/or particulate polymer is removed prior to the water contacting. The amount of soluble olefin polymer in the liquid polymerization reaction mixture can depend upon the polymerization reaction conditions, catalyst activity, catalyst productivity, and/or the catalyst deactivation compounds. It is possible for the polymerization reaction and insoluble polymer separation processes to be very efficient and complete and, thus, only a small amount of soluble polymer can remain in the reaction mixture. Conversely, inefficient and incomplete polymerization reaction and insoluble polymer separation processes can result in an increased amount of soluble polymer in the reaction mixture.

The liquid polymerization reaction mixture comprising olefin monomer, catalyst residue, catalyst deactivation compounds, and, optionally, soluble olefin polymer can be contacted with water according to any method known in the art. The contacting process can be continuous or batchwise. Preferably, the water is added to the liquid polymerization reaction mixture and the resultant solution is agitated, or stirred, slightly to result in a good separation of relatively clean olefin monomer.

Sufficient amounts of water are used to separate substantially all of the catalyst residue and catalyst deactivation compound(s) from the olefin monomer and, optionally, the olefin polymer. An excess of water can be used with substantially no detrimental effect. However, for economics and ease of operation, the maximum water to liquid reaction mixture ratio, based on weight, usually is equal to or less than about 5:1, preferably equal to or less than about 4:1. Most preferably, the water to reaction mixture ratio is equal to or less than about 2:1, i.e., about 2 parts by weight water to about 1 part by weight reaction mixture, for the above reasons. In order to obtain an effective separation, the water to liquid reaction mixture ratio, on a weight basis, usually is equal to or greater than about 0.2:1, and preferably equal to or greater than about 0.5:1. Most preferably, the water to reaction mixture is equal to or greater than about 0.7:1, i.e., about 0.7 parts by weight water to about 1 part by weight reaction mixture, for the reasons given above. Thus, the most preferred amount of water is that needed to give a water/liquid reaction weight ratio within the range of about 0.7:1 to about 2:1.

The contacting of the water and liquid reaction mixture can be done at any temperature and pressure such that both the reaction mixture and water remain in liquid form. For ease of operation, atmospheric pressure can be employed and the temperature of each liquid is within the range of about 0° to about 100° C. Preferably, at atmospheric pressure, the temperature of each liquid is within the range of about 5° to about 70° C., and most preferably, within the range of about 10° to about 50° C.

After the addition of water and after any desired agitation or stirring, the phases can be allowed to separate. An organic phase and an aqueous phase can be formed. The organic phase comprises primarily olefin monomer and, if present, soluble olefin polymer. The aqueous phase comprises catalyst residue and catalyst deactivation compounds.

A second physical separation, which comprises separating the organic phase from the aqueous phase, can be done according to any method known in the art. Each phase can be further separated, in a third or fourth separation, if necessary, to recover and, optionally, recycle any components. The aqueous phase can be separated, such as, for example, by distillation, to recover catalyst deactivation compounds, such as, for example, methanol and/or ethanol. The catalyst residue, if desired, can also be recovered.

The organic phase, which comprises olefin monomer, soluble olefin polymer, and/or minor amounts of water, can be separated to recover olefin monomer and/or soluble olefin polymer. As with the aqueous phase, any separation method, such as, for example, distillation, can be used. Preferably, the organic phase is dried, or substantially all water is removed, prior to separation of olefin monomer and/or soluble olefin polymer. However, the organic phase can be dried after any separation and/or purification, if desired. Any drying process can be used, such as for example, using alumina and/or molecular sieves, to remove trace amounts of water in the organic phase or any portion of the organic phase.

A more comprehensive understanding of the invention can be obtained by referring to the following examples.

EXAMPLE 1

Samples of deionized water, reagent grade alcohol, and 4-methyl-1-pentene (4MP1) were heated to 37.8° C. (100° F.) in a water bath. Different amounts of each of these three liquids were combined and allowed to phase separate in the same 37.8° C. water bath. Aliquots of the aqueous and organic, or hydrocarbon, phases of each mixture were analyzed on a Perkin-Elmer model 3920 gas chromatograph, equipped with a thermal conductivity detector. The column was a 6 feet by 1/8 inch stainless steel column, packed with 50/80 mesh Poropac Q ®, available from Waters Chromatography Division, Millipore Corp. The injection temperature was 75° C., the oven was 80° C., the interphase was 200° C., and the detector was 250° C. The detector current was 225 milliamps. Helium, at a flow rate of 30 cc/min, was the carrier gas.

The results of the analyses are given in Table I.

TABLE I

| | | Aqueous Phase | | | Hydrocarbon Phase | | |
|---|---|---|---|---|---|---|---|
| Run | Alcohol | Alcohol, Wt. % | Water, Wt. % | 4MP1, Wt. % | Alcohol, Wt. % | Water, Wt. % | 4MP1, Wt. % |
| 101 | methanol | 18.7 | 80.9 | 0.4 | 0.3 | 0.2 | 99.5 |
| 102 | methanol | 42.1 | 57.4 | 0.5 | 0.4 | 0.2 | 99.4 |
| 103 | methanol | 63.9 | 34.5 | 1.6 | 1.8 | 0.2 | 98.0 |
| 104 | methanol | 74.6 | 18.6 | 6.8 | 4.6 | 0.2 | 95.2 |
| 105 | n-propanol | 10.2 | 89.0 | n.d.* | 4.5 | 0.3 | 95.2 |
| 106 | n-propanol | 9.6 | 90.4 | n.d. | 3.5 | 0.4 | 96.1 |

*n.d. = none detectable

The data in Table I show that 4MP1 can be separated, in a relative water-free form, from water. The data also show that a methanol and water mixture can be more efficiently separated than an n-propanol and water mixture.

EXAMPLE 2

A liquid polymerization reaction mixture comprising 4-methyl-1-pentene (4MP1), catalyst residue, and catalyst deactivation compounds, totalling 100 parts by weight, was distilled using a 24 inch Goodloe packed column. The catalyst residue comprised soluble titanium, chloride, and/or aluminum. The catalyst deactivation compounds comprised 2-(2-butoxyethoxy)ethanol and propylene oxide. When the distillation was stopped, 8.9 parts by weight remained in the kettle bottom. The distillation data and results are given in Table II.

A similar polymerization reaction mixture, also totalling 100 parts by weight was contacted and washed with two, 50 parts by weight, portions of water. The resulting sample, 98.5 parts by weight, was distilled, as the above, non-water-washed mixture. When the distillation was stopped, 9.4 parts by weight, based on the original 100 parts by weight, remained in the kettle bottom. The distillation data and results are given in Table III.

Both distillations were done at atmospheric pressure, with a reflux ratio of 2:1.

TABLE II

| Run | Elapsed Time (mins) | Kettle Temp. (°C.) | Head Temp. (°C.) | Parts Removed (by weight) | 4MP1 Purity (Wt %) |
|---|---|---|---|---|---|
| 201 | 0 | 24 | 24 | 0 | — |
| 202 | 30 | 53 | 50 | 0 | — |
| 203 | 50 | 54 | 51 | 0 | — |
| 204 | 62 | 54 | 51 | 2.9 | 90.9 |
| 205 | 65 | 54 | 52 | 3.8 | 91.4 |
| 206 | 84 | 54 | 52 | 3.9 | 91.8 |
| 207 | 90 | 54 | 52 | 3.2 | 91.7 |
| 208 | 100 | 54 | 52 | 2.5 | 92.0 |
| 209 | 125 | 55 | 52 | 12.0 | 93.2 |
| 210 | 155 | 56 | 53 | 13.4 | 96.3 |
| 211 | 187 | 57 | 53 | 10.4 | 98.7 |
| 212 | 224 | 59 | 54 | 13.1 | 99.5 |
| 213 | 266 | 63 | 54 | 11.5 | 99.9 |
| 214 | 315 | 90 | 55 | 11.9 | 99.9 |
| 215 | 330 | 112 | 56 | 1.8 | 99.2 |

TABLE III

| Run | Elapsed Time (mins) | Kettle Temp. (°C.) | Head Temp. (°C.) | Parts Removed (by weight) | 4MP1 Purity (Wt %) |
|---|---|---|---|---|---|
| 216 | 0 | 24 | 24 | 0 | — |
| 217 | 40 | 56 | 52 | 0 | — |
| 218 | 49 | 56 | 54 | 3.5 | 99.8 |
| 219 | 70 | 56 | 54 | 4.0 | 99.9 |
| 220 | 108 | 56 | 54 | 13.1 | 100 |
| 221 | 128 | 57 | 54 | 10.7 | 99.9 |
| 222 | 161 | 57 | 54 | 15.6 | 99.9 |
| 223 | 194 | 58 | 54 | 10.6 | 99.9 |
| 224 | 235 | 63 | 54 | 16.7 | 100 |
| 225 | 267 | 85 | 54 | 12.1 | 100 |
| 226 | 275 | 100 | 57 | 2.1 | 98.9 |

The purity of the 4MP1 samples in Tables II and III show that a water wash more efficiently removes any impurities from the 4MP1 than only distillation.

While this invention has been described in detail for the purpose of illustration, it is not to be construed as limited thereby but is intended to cover all changes and modifications within the scope and spirit thereof.

That which is claimed is:

1. A process to separate and recover olefin monomer from a substantially liquid polymerization reaction mixture comprising olefin monomer, catalyst residue, and catalyst deactivation compounds wherein said process comprises:
(a) contacting said mixture with a sufficient amount of water to form an organic phase, which comprises olefin monomer, and an aqueous phase, which comprises catalyst residue and catalyst deactivation compounds; and
(b) separating said organic phase from said aqueous phase.

2. A process according to claim 1 wherein said liquid polymerization reaction mixture further comprises soluble olefin polymer.

3. A process according to claim 1 wherein said water contacting is done at a temperature and pressure sufficient to maintain the water and the liquid mixture in a liquid state.

4. A process according to claim 1 wherein the ratio of water to liquid mixture, on a mass basis, is within the range of about 0.2:1 to about 5:1.

5. A process according to claim 1 wherein said olefin monomer has from about 2 to about 30 carbon atoms per molecule.

6. A process according to claim 1 wherein said olefin monomer has from about 3 to about 20 carbon atoms per molecule.

7. A process according to claim 1 wherein said olefin monomer is selected from the group consisting of linear alpha-olefins, higher, branched alpha-olefins, and mixtures thereof.

8. A process according to claim 1 wherein said catalyst residue comprises a component selected from the group consisting of at least one catalytic transition metal, at least one halogen, at least one organo-metallo compound, and mixtures thereof.

9. A process according to claim 8 wherein said catalyst residue comprises titanium, chlorine, and aluminum.

10. A process according to claim 1 wherein said catalyst deactivation compound is an alcohol.

11. A process according to claim 10 wherein said alcohol is selected from the group consisting of methanol, ethanol, and mixtures thereof.

12. A process according to claim 2 wherein said soluble olefin polymer is selected from the group consisting of homopolymers of 4-methyl-1-pentene and copolymers of 4-methyl-1-pentene and other linear, alpha-olefins.

13. A process according to claim 1 further comprising drying said organic phase.

14. A process according to claim 2 further comprising separating said olefin monomer in the organic phase from said soluble olefin polymer in the organic phase.

15. A process to separate and recover olefin monomer from a substantially liquid polymerization reaction mixture comprising olefin monomer, soluble olefin polymer, catalyst residue, and alcohol, wherein said process comprises:
(a) contacting said mixture with a sufficient amount of water to form an organic phase, which comprises olefin monomer and soluble olefin polymer, and an aqueous phase, which comprises catalyst residue and alcohol;
(b) separating said organic phase from said aqueous phase; and
(c) separating said organic phase to recover olefin monomer.

16. A process according to claim 15 wherein said olefin monomer is selected from the group consisting of 4-methyl-1-pentene, 1-octene, 1-decene, 1-dodecene, 1tretadecene, 1-hexadecene, and mixtures thereof.

17. A process according to claim 15 wherein said alcohol is methanol.

18. A process to separate and recover 4-methyl-1-pentnene from a substantially liquid polymerization reaction mixture comprising 4-methyl-1-pentene, catalyt residue, and catalyst deactivation compounds wherein said process comprises:
(a) contacting said mixture with a sufficient amount of water to form an organic phase, which comprises 4-methyl-1-pentene, and an aqueous phase, which comprises catalyst residue and catalyst deactivation compounds; and
(b) separating said organic phase from said aqueous phase.

19. A process according to claim 18 wherein said liquid polymerization reaction mixture further comprises soluble polymethylpentene.

20. A process according to claim 18 wherein said catalyst residue comprises titanium, chlorine,and aluminum.

21. A process according to claim 18 wherein said catalyst deactivation compound is methanol.

22. A process to separate and recover 4-methyl-1-pentene from a substantially liquid polymerization reaction mixture comprising 4-methyl-1-pentene; soluble homopolymers of 4-methyl-1-pentene; catalyst residue, wherein said residue is selected from the group consisting of titanium, chloride, aluminum, and mixtures thereof; and methanol, wherein said process comprises:
(a) contacting said mixture with about 0.2 to about 5 parts by weight of water per about one part by weight of said mixture;
(b) forming an organic phase, which comprises 4-methyl-1-pentene and soluble homopolymers of 4-methyl-1-pentene, and an aqueous phase, which comprises catalyst residue and methanol;
(c) separating said orgnic phase from said aqueous phase;
(d) separating said 4-methyl-1-pentene from said soluble homopolymers of 4-methyl-1-pentene; and
(e) recovering said 4-methyl-1-pentene and said soluble homopolymers of 4-methyl-1-pentene.

23. A process to separate and recover 4-methyl-1-pentene from a substantially liquid polymerization reaction mixture comprising 4-methyl-1-pentene and an olefin comonomer, wherein said comonomer is selected from the group consisting of 1-decene, 1-dodecene, 1-tetradecene, 1hexadecene, and mixtures thereof; soluble copolymers of 4-methyl-1-pentene and longer chain, linear olefins; catalyst residue, wherein said residue is selected from the group consisting of titanium, chloride, aluminum, and mixtres thereof; and methanol, wherein said process comprises:
(a) contacting said mixture with about 0.2 to about 5 parts by weight of water per about one part by weight of said mixture;
(b) forming an organic phase, which comprises 4-methyl-1-pentene, olefin comonomer, and soluble copolymer, and an aqueous phase, which comprises catalyst residue and methanol;
(c) separating said organic phase from said aqueos phase;
(d) separating siad 4-methyl-1-pentene and said olefin comonomer from said soluble copolymer; and
(e) recovering said 4-methyl-1-pentene, said olefin comonomer, and said soluble copolymer.

24. A process to separate and recover olefin monomer from a substantially liquid polymerization reaction mixture consisting of olefin monomer, catalyst residue, and catalyst deactivation compounds wherein said process comprises:
  (a) contacting said mixture with a sufficient amount of water to form an organic phase, which comprises olefin monomer, and an aqueous phase, which comprises catalyst residue and catalyst deactivation compounds; and
  (b) separating said organic phase from said aqueous phase.

25. A process to separate and recover 4-methyl-1-pentene from a substantially liquid polymerization reaction mixture consisting of 4-methyl-1-pentene, catalyst residue, and catalyst deactivation compounds wherein said process comprises:
  (a) contacting said mixture with a sufficient amount of water to form an organic phase, which comprises 4-methyl-1-pentene, and an aqueous phase, which comprises catalyst residue and catalyst deactivation compounds; and
  (b) separating said organic phase from said aqueous phase.

* * * * *

UNITED STATES PATENT AND TRADEMARK OFFICE
CERTIFICATE OF CORRECTION

PATENT NO. : 4,940,833

DATED : July 10, 1990

INVENTOR(S) : Charles A. Drake et al

It is certified that error appears in the above-identified patent and that said Letters Patent is hereby corrected as shown below:

Column 8, claim 16, line 2, delete "1tretadecene" and insert --- 1-tetradecene ---.

Column 8, claim 18, line 2, delete "pentnene" and insert --- pentene ---.

Column 8, claim 18, lines 3 and 4, delete "catalyt" and insert --- catalyst ---.

Column 8, claim 23, line 6, delete "1hexadecene" and insert --- 1-hexadecene ---.

Column 8, claim 23, line 19, delete "aqueos" and insert --- aqueous ---.

Column 8, claim 23, line 21, delete "siad" and insert --- said ---.

Signed and Sealed this

Twenty-fourth Day of December, 1991

Attest:

HARRY F. MANBECK, JR.

*Attesting Officer*     *Commissioner of Patents and Trademarks*